Oct. 3, 1961  C. V. MORINE  3,002,473
PINEAPPLE PLANTING MACHINE
Filed Sept. 18, 1957  6 Sheets-Sheet 1

INVENTOR.
Charles Victor Morine
BY Victor J. Evans & Co.
ATTORNEYS

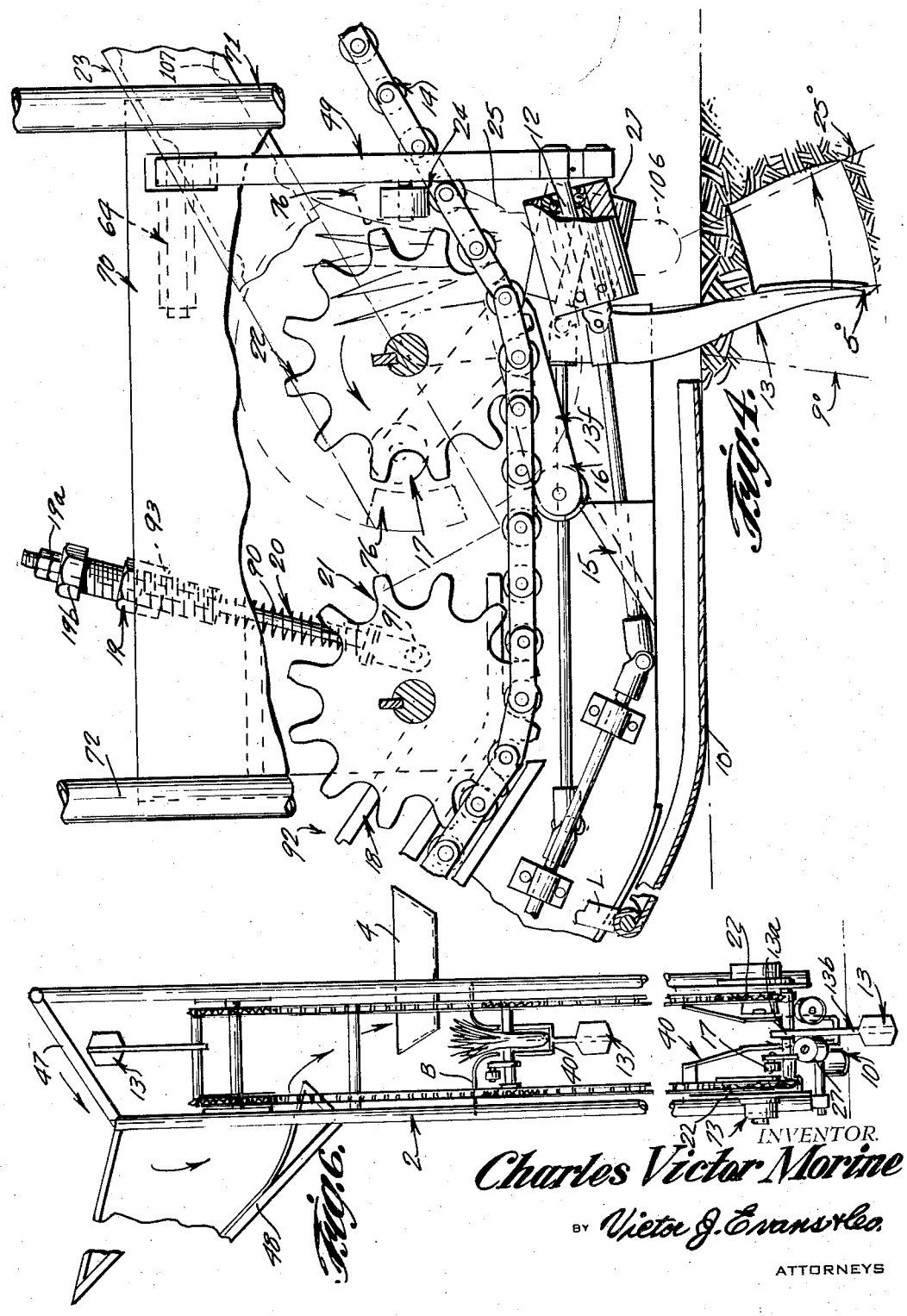

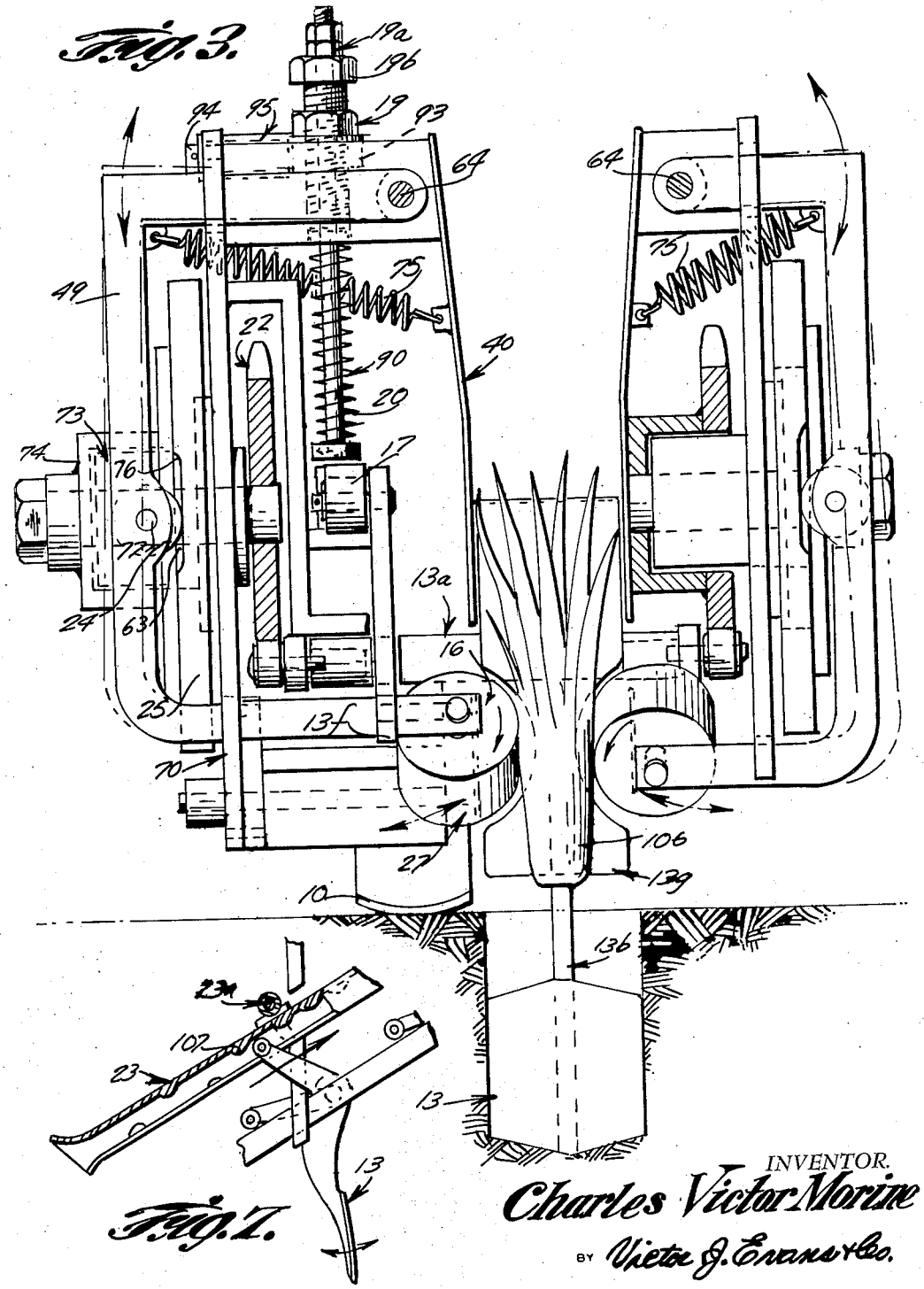

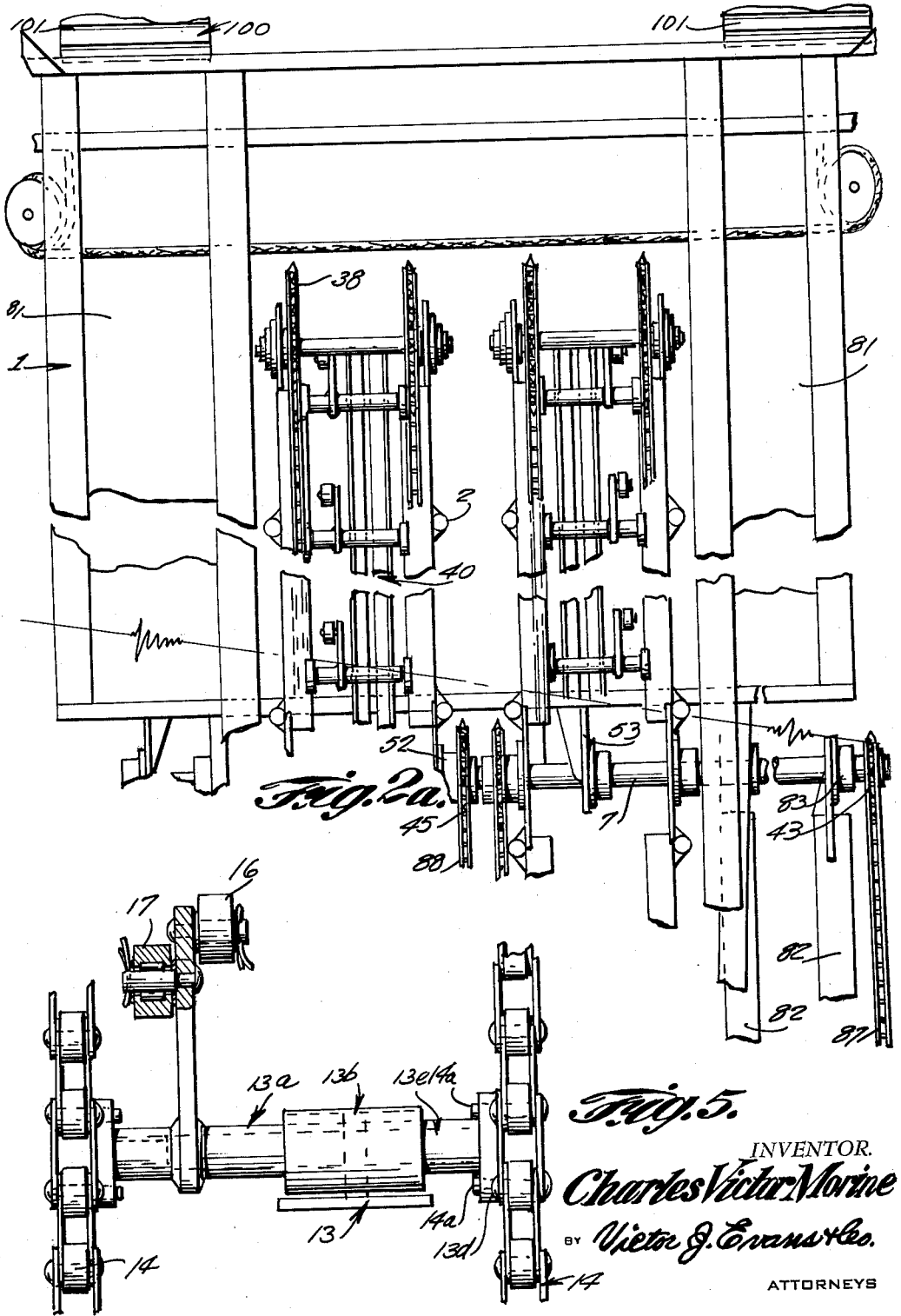

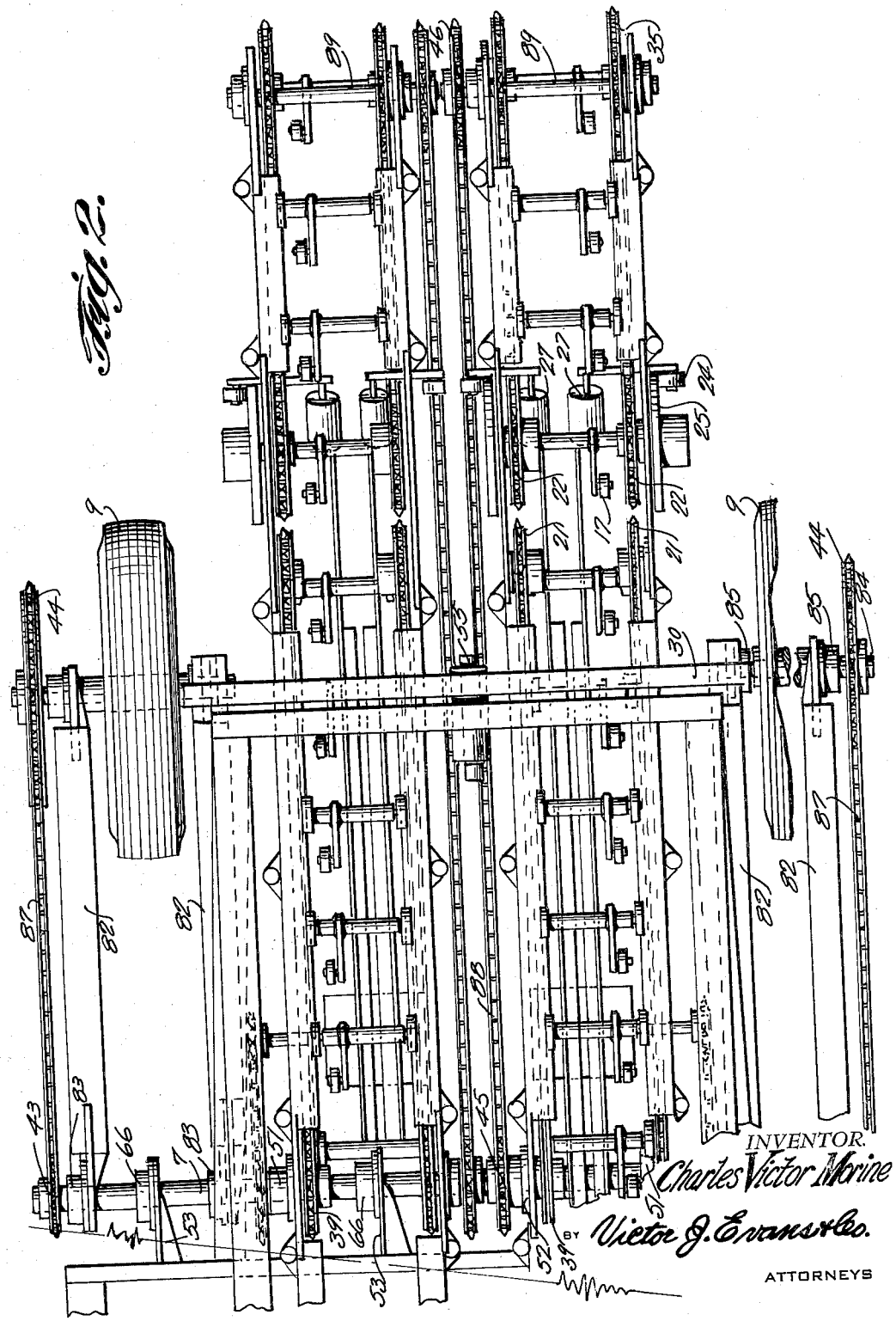

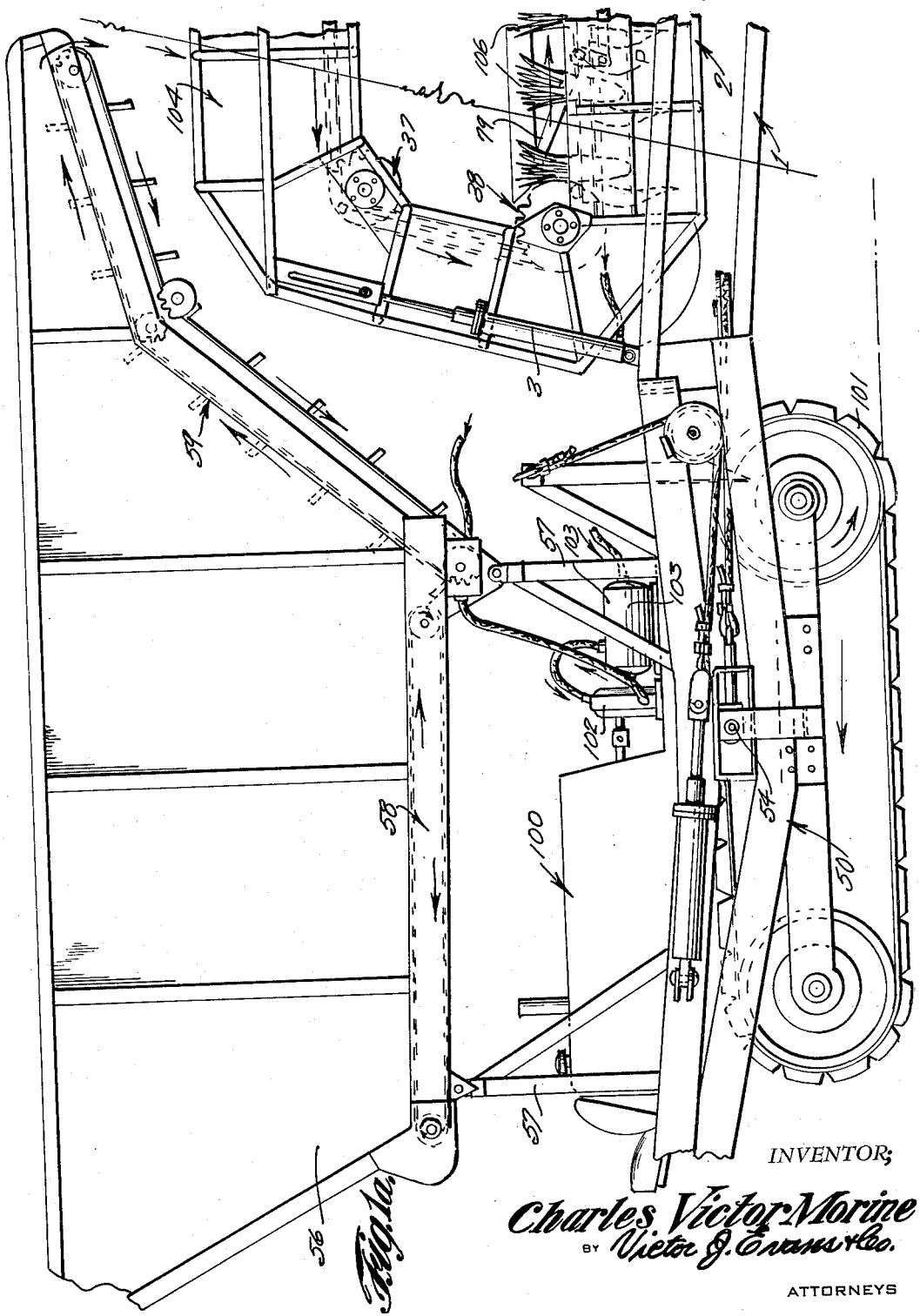

3,002,473
PINEAPPLE PLANTING MACHINE
Charles Victor Morine, 99-1225 Aiea Heights Drive,
Aiea Oahu, Hawaii
Filed Sept. 18, 1957, Ser. No. 684,789
2 Claims. (Cl. 111—2)

This invention relates to an agricultural implement, and more particularly to a machine for use in planting pineapple shoots.

The object of the invention is to provide a pineapple planting machine which is an improvement over the planting machine shown and described in my prior Patent No. 2,626,578.

Another object of the invention is to provide a pineapple planting machine which includes a frame that is adapted to be mounted on a conventional tractor and wherein there is provided a planter which is arranged rearwardly of the tractor, so that a plurality of pineapple shoots or plants can be automatically inserted or positioned in the ground at the proper location.

Another object of the invention is to provide a pineapple planting machine which includes a hopper or basket that is adapted to be supported above the tractor, and wherein the hopper is adapted to hold a plurality of the shoots which are to be planted, the hopper including a conveying means whereby the shoots are automatically moved onto the planter at the proper time, and wherein workmen are adapted to stand on a platform adjacent to the planter so that the shoots can be readily fed or supplied to mechanism which will automatically insert or plant the shoots at the proper position in the ground.

A still further object of the invention is to provide an agricultural machine for use in setting out young plants of any desired type, although the machine of the present invention is especially suitable for use in planting young pineapple shoots, and wherein with the present invention the shoots are adapted to be fed automatically through the mulch paper in the ground, so that a plurality of the young pineapple shoots can be easily and quickly set at a uniform depth in the soil and wherein the shoots will be planted uniformly and efficiently.

A further object of the invention is to provide a pineapple planting machine which is simple and inexpensive to manufacture.

Other objects and advantages will be apparent during the course of the following description.

In the accompanying drawings, forming a part of this application, and in which like numerals are used to designate like parts throughout the same.

FIGURE 1a and FIGURE 1 are side elevational views illustrating the tractor and planter which make up the pineapple planting machine of the present invention, and with parts broken away and in section.

FIGURE 2a and FIGURE 2 are top plan views illustrating portions of the two unit pineapple planting machine of the present invention, and with parts broken away or removed.

FIGURE 3 is an end elevational view illustrating the plant inserting and handling mechanism, and with parts broken away and in section.

FIGURE 4 is a side elevational view of the mechanism shown in FIGURE 3, and with parts broken away and in section.

FIGURE 5 is a fragmentary plan view illustrating one of the blade assemblies, and with parts broken away and in section.

FIGURE 6 is a fragmentary end elevational view showing the tray for receiving the pineapple shoots.

FIGURE 7 is a fragmentary elevational view, with parts broken away and in section, showing certain structural details of the apparatus.

Figure 1:
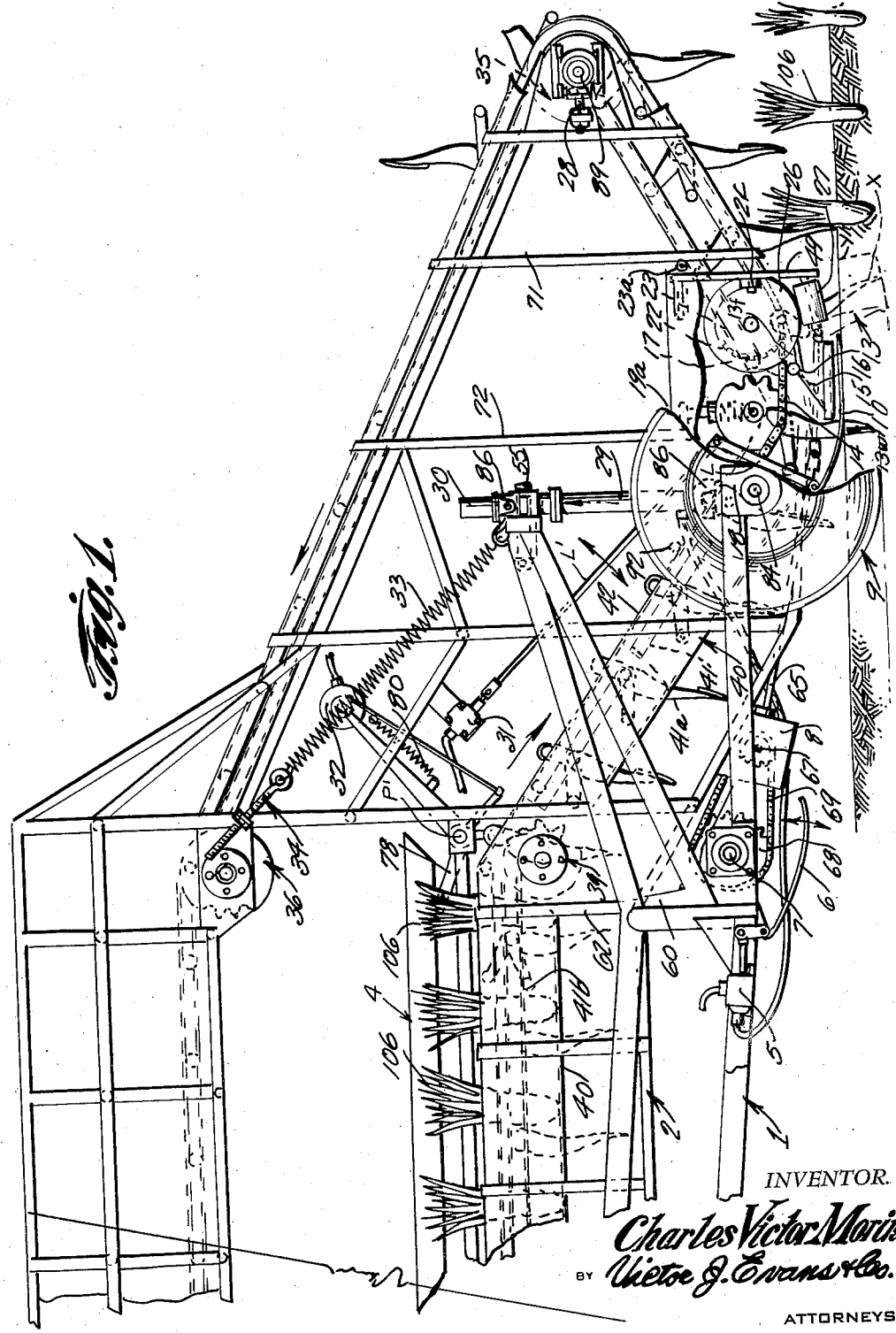

Referring in detail to the drawings, it will be seen that there has been provided an agricultural machine which is adapted to be used for setting out young plants and wherein the machine is especially suitable for setting out young pineapple shoots.

On a pineapple plantation after a field has been prepared, it is customary to lay out mulch paper in strips with uniform walking spaces therebetween. The planting material which is called "shoots," is obtained from mother plants in other growing fields, and these shoots which are either slips, suckers or tops, consist of a leafy plant ranging in overall length from 12" to 20" and a butt diameter from 1" to 2".

According to the present method of planting, the shoots are set manually through the mulch paper in the ground into a hole made by a planting iron. This operation is very strenuous, and requires men of considerable strength and durability. By means of the present invention the aforementioned difficulties or objections are overcome and the present invention serves to eliminate the burdensome and strenuous task of manual planting and is an improvement over prior Patent 2,626,578, and also serves to set the shoots at a uniform depth in the soil, and it also serves to space the planted shoots uniformly as well as to provide a means for transporting shoots on the machine so as to eliminate the spreading of shoots in the field preparatory to planting.

In the drawings, the numeral 100 indicates in FIGURE 1a, a conventional tractor of the crawler type, and the tractor 100 includes the usual treads 101, and also mounted on the tractor body is a pump 102 which can be operated by the tractor engine in any suitable manner. The numeral 103 indicates a tank which is arranged adjacent the pump 102, and the tank 103 is adapted to hold a suitable quantity of hydraulic fluid.

Connected to the tractor 100 is an outer frame 50, FIGURE 1a, and there is further provided a planter main frame 1 which forms part of the planter 104, and the frames 50 and 1 remain in a relatively horizontal position during the planting operation. The frame 50 is hinged on the tractor 100 and supported by pins and brackets 54, and the planter frame is supported at the rear by a pin 55 and equalized bar 30 to a pair of spaced parallel ground engaging wheels 9. These frames may be integrally welded together so as to become in effect one rigid frame.

As stated previously, the tractor is of the conventional crawler type and includes the tracks 101 which are spaced so as to run between the strips of mulch paper. The tractor 100 serves to steer the planter 104 and serves to provide motive power for the planter through the ground wheels 9 of the planter and also furnishes power to drive the planter mechanism as later described in this application.

The numeral 56 indicates a feed basket or hopper, FIGURE 1a, which is supported on the frame 50 by means of vertical members 57. The hopper 56 that is supported by the members 57 has a conveyor bottom 58 and a seed elevator 59 whereby the seeds or shoots can be carried to the planter as indicated by the arrows in FIGURE 1a, and the conveyors 58 and 59 may be driven by hydraulic motors and oil pump which derives its power from the tractor motor.

The planter 104 includes sub-frames 2 which can be made of any suitable material such as light weight tubing and the sub-frames may have longitudinal, vertical and angular side members which are integrally welded together with sufficient cross members and braces between the side members to properly reinforce or strengthen the parts. These sub-frames 2 are supported on each side of main frame 1 by integrally welded brackets 60 and flanged bearings 51 and 52, and a counter shaft 7 permits the sub-frames to pivot independently of the main frame. There is further provided suitable flange type bearings which can be bolted to plates that are welded to the side members for carrying shafts having a plurality of sprockets 35, 36, 37 and 38. The sprockets 21 and 22 and 39 are arranged so as to permit movement of the blade assemblies 13 and slants through a plant trough 40 in the proper manner whereby there will be the proper clearance in order to permit the necesary movement of the parts to take place.

There is further provided a pair of large roller chains which extend around sprockets 21, 22, 35, 36, 37, 38 and over 39 and these chains are arranged in two continuous lengths and run parallel to each other. These chains are spaced to accommodate the blade spools 13a, FIGURE 3. The tension on these chains is adjusted by means of take-up bearings 28, FIGURE 1. These chains are standard double pitch chains with oversize rollers 14, FIGURE 5, with two extended pins in one common link as indicated by the reference character 14a, spaced at regular intervals on every sixth link. These pins extend through a special adapter plate 13d to which a stub shaft 13e is welded, and this shaft extends through bushings in each end of spool 13a and permits the blade assembly 13 to pivot thereon.

The reference characters 41 and 41a indicate chain roller guides which may be flat metal bars that are welded to the inside of the sub-frame 2 vertical and angular side members, and these guides follow the inner and outer periphery of the chains 14 in their path between the sprockets. Roller guides 41b and 42 are similarly welded to the same members on an even plane with the guides 41 and 41a, and guide rollers 17 which control the angle of blade assemblies in relation to the chains.

There is further provided a gauge shoe 10 which is adapted to run or travel on the surface of the mulch paper for controlling the depth of planting by means of linkage L and L' which leads to valve 31, and the valve 31 is connected by a suitable hydraulic conduit means or hose to a cylinder 3 connected between the main and the planter frames. Thus, any change in elevation between the ground wheels 9 and the mulch paper will cause the gauge shoe 10 to rise or lower which will actuate the valve 31 and cylinder 3 so as to overcome the tension of the spring 33 through the linkage L and L', FIGURE 1. The spring 33 is adapted to be anchored to a screw mechanism 34 which can be adjusted in order to vary or regulate the tension of the spring 33. This will serve to maintain an even distance between the planting rollers 27 and the mulch paper.

The rollers 27, FIGURES 3 and 4, are supported by arms 49 and suitable bearings revolving on a shaft 12. The arms 49 are hinged at the top on a shaft and spool 64 and move laterally in opposite directions in unison to open and close the rollers 27. They are equipped with roll members or rollers 24 which are held in contact with notched plates 25 by means of a spring 75. These plates are bolted to flanged hubs 74 which are keyed to a shaft 63, and which is supported at one of its ends by bearings 73 and is welded to the sprocket 22 at its other end and derives its power from the chains 14.

As shown in the drawings, the rollers 27 are connected by a drive shaft 65 to a gear box 8. The sprockets 67 and 68 and the chain 69 derive power from the countershaft 7. Countershaft 7 is supported by suitable flange bearings 66 which are bolted to brackets 53 that are adapted to be welded to the main frame cross members. The wheels 9 are properly spaced to travel between strips of mulch paper and the wheels 9 are supported by longitudinal members 82 which are adapted to be provided with flange type bearings 85 and which are keyed to the shaft 84. The wheel frame 82 is supported by flange type bearings 83 on the countershaft 7 which provides a hinge point.

The wheel frame and equalizer bar 30 are connected by vertical cylinders 29 and universal joints 86 which permit the wheels 9 to fluctuate over uneven terrain without changing the centers of the sprockets 43 and 44. The sprockets 44 are keyed to the shafts 84 and are caused to revolve with the wheels 9 and they are connected by chains 87 to the sprockets 43 which drive the countershaft 7. The sprockets 45 are keyed to the shaft 7 and furnish power to the sprocket 46 by means of the chain 88. The sprocket 46 and sprockets 35 are keyed to the shaft 89 driving chains 14.

There is further provided a shoe 6 which hinges on the frame 1 with linkage to the valve 5 which is connected by hydraulic hoses or conduits to the cylinders 29. Thus, on uneven terrain or ground, in the event that the shoe 6 comes in contact with the mulch paper, it would lift to actuate the valve 5 and thereby admit oil pressure to the cylinder 29 so as to provide more clearance under this portion of the machine. This action does not affect the planting, since the shoe 10 will compensate for the above action.

In use, the shoots which are indicated by the numeral 106, are loaded into the hopper 56 on the tractor 100, FIGURE 1a, and these shoots 106 are carried to the planter 104 by means of the conveyor 58 and elevator 59. The shoots drop from the elevator conveyor 59 onto the sheet metal covering or guide member 47, FIGURE 6, and then onto the sheet metal cover frame 48 which extents longitudinally along the upper frame, and from here the shoots slide down and fall into the plant tray 4. This tray is suspended on arms 78 and 79 and is supported in an upright position by means of the spring 80, the letters P and P' indicating pivot points or pivot pins for the lower ends of the arms 78 and 79. As the tray gets lighter due to removal of the plants therefrom, the spring 80 will cause the tray to move upwardly since the arms 78 and 79 which support the tray can pivot on the pivot pins P and P'. The tension of the spring 80 is regulated to support the weight of the plant tray 4 plus forty to fifty shoots, and the weight of these members overcomes the spring tension and closes the conventional valve 32 at the proper time, and the valve 32 is operatively connected to a suitable driving or power means as for example by hydraulic hoses or conduits whereby power can be supplied for operating the plant elevator 59. It is to be noted that as the plants are removed by the workmen or feeders, the tray 4 becomes lighter whereby the spring 80 will automatically raise the tray 4 so as to cause the valve 32 to open and this will automatically admit oil pressure to the hydraulic motor drive mechanism for the plant elevator 59 which will be set in motion and thereby refill tray 4.

When the pineapple shoots are being planted, the workmen stand on the platform 81, FIGURE 2a, and take the plants from tray 4 and place them butt-end down into the plant trough 40 between planting blade assemblies. The bottom portion of the trough 40 acts as a stop for the plants, and insures an even depth of planting. The plants 106 are crowded through and to the end of the trough 40 by the metal plate 13g which is attached to each planting blade assembly. As the plants leave the end of the trough 40, they are crowded between and to the center of the rollers 27. At this point the slot 76 of the plate 25 permits the arms 49 to be drawn together by the springs 75 so as to close the rollers 27 on the plants 106. The peripheral speed of the rollers 27 is such that the plant is injected into the opening prepared by the blade 13 to the proper depth while rollers 24 remain in the plate slot 76. Thus, when the plate slots 76 are in registry or alignment with the rollers 24, the arms 49 will be moved inwardly and towards each other, and when the plate slots 76 are out of engagement with the rollers 24, the arms 49 are moved outward so as to release the plant 106. The rollers 27 are thus held in an open position by means of the plate 25 to receive the next plant. The planting rollers 27 are set on an angle with respect to each other for the purpose of giving the plant a slight twist on its downward travel into the soil.

The sprocket ratio from ground wheels 9 to chains 14 is such that the lower strands of the chains 14 travel between the guides 41 and 41a in a rearward direction at approximately the same speed as the machine is moving forward. Thus, the blade assembly spools 13a remain neutral to the forward ground travel of the machine.

Beginning with the blade 13w as shown in FIGURE 1 for example, at this point the blade has passed through the mulch paper and entered the soil. As the entire machine except the blade assemblies 13 are moving forward at tractor ground speed, the pivot point of the blades remain above and in direct relationship to the point where the blade entered the soil. As the machine moves forward, the roller guide 18 and roller 17 are in engagement with each other. Due to the angle of this guide in relation to the path of the blade spool 13a, the planting blade 13 is forced to the rear as shown at blade position X, FIGURE 1.

As shown in the drawings, there is provided stationary chain guides 41 and 41a whereby the chains will be guided or maintained in their proper location or position. The roller guide 18 is hingedly or pivotally supported as at 92, and the coil spring 20 provides sufficient pressure to hold the roller guide 18 in the proper location. The coil spring 20 can give as for example when the roller 17 moves below and beyond the roller guide 18, and as the roller 17 moves past the roller guide 18, the cam 15 engages the roller 16 so as to lift the arm 13f which causes the blade 13 to move rearwardly to thereby open a void in the soil below the mulch paper and soil surface. The amount of this opening can be adjusted for more or less if desired depending upon the soil moisture. This can be acquired by means of the nut 19a on the hinged roller guide 18. The remaining soil above the opening made by the forward movement of the blade is taken down and serves to fill in and around the butt of the shoot. The downward flow of soil and the injection of the shoot is facilitated due to the vacuum created at the rear of the blade by its rapid forward movement. The compression spring 20 can be adjusted by means of the member 19b to prevent breakage in the event that the blade comes in contact with an obstacle or foreign object in the soil. Tension is set to operate the blade in reasonably loose soil.

After the shoot is set, and the machine continues to move forward, the planting blades are lifted from the soil and during this time the roller 17 leaves the guide 18, enters the double track 23 which is hinged as at 23a attached to roller guide and vertical member 71.

It is to be noted that the blade assembly 13 consists of a hollow spool 13a, FIGURE 5, which is bushed at each end and which extends laterally between the chains 14. The blade bracket 13b is a flat piece of metal bar with proper curvature as shown by FIGURE 6. This curvature serves the purpose of preventing the butt of the shoot from being crowded to the rear as the blade assembly is tilted while opening a void in the soil. The bracket 13b is welded to the spool 13a and extends downward during feeding and planting positions and also supports the curved blade or paddle 13, FIGURE 3. The paddle 13, FIGURE 4, is welded to the rearward edge of bracket 13b and has the proper curved radius to compensate for the slight forward movement of the blade spools 13a as the paddle is being withdrawn from the soil. The metal shield 13g, FIGURE 3, is welded to the rearward edge of bracket 13b and spool 13a and extends above spool 13a and then is curved downward to form a rounded divider between shoots. This plate fits loosely between the inside wall surface and bottom of trough 40. It is cut away on each side on an equal radius to that of rollers 27 to permit its passage between rollers, to a point sufficient to place shoots 106, FIGURES 3 and 4, at approximately roller face center and not interfere with the rollers 27 while in a closed position and gripping shoots.

Angular bracket 13f, FIGURE 4, is welded to the spool 13a at the proper angle to blade bracket 13b supporting rollers 16 and 17. The roller 17 is carried between guide tracks 41 and 42, FIGURE 1, for controlling the angle of the blade assemblies. Stub shafts 13e, FIGURE 5, are welded to adapter plate 13d extending through bushings fitted to each end of spool 13a so as to form a hinge point for the entire blade assembly between chains. The standard chains 14 are fitted with two extended pins in one common link. These pins extend through special adapter blade 13d for supporting blade assemblies 13.

The adjustable roller guide 18, FIGURE 4, is a flat metal bar which is hinged at the forward end 92 to track 42, FIGURES 1 and 4, and at the rearward end to adjustment rod 90. The height of this portion of the roller guide can be adjusted at the rearward end by adjustments 19a, 19b, and compression spring 20. The adjusting rod 90, FIGURE 4, is connected to hinge point 91 and extends upward through spring 20, adjusting screw 19b and lock nut 19. The lock nut 19 is locked to the pivot nut 93 which is equipped with a stub shaft 94 that extends through the spool 95, FIGURE 3, which is welded to the plate 70. The tension on the spring 20 can be set by the adjusting nuts 19b. The height of the guide 18 at the rearward end determines the angle to which the blade 13 is forced to the rear. The amount of tension on spring 20 determines the amount of pressure exerted against the soil at the rear of the blade 13. Should this pressure be greater than that required for normal operating conditions, the roller 17 would force the guide 18 upward so as to compress the spring 20, whereby the roller 17 would be permitted to pass through without damage to the working parts.

The flanges of this track are parallel except at the forward end where the roller 17 enters, and here they have a wider opening for the purpose of guiding roller 17 properly as it enters. At alternate spacing, low cams 107, FIGURE 7, are welded to the inside of upper and lower flanges for the purpose of creating a vibrating effect on blade 13. As the track is more or less in a floating position, the blade 13 is free to be drawn from the soil without undue pressure on the side of the shoot, which may otherwise tend to lift the shoot from the soil.

The means for grasping and injecting the shoot into the soil consists of two rollers 27, FIGURES 3 and 4. They are preferably constructed of a light metal such as aluminum and faced with a soft rubber coating to prevent bruising the shoots. A universal joint is connected to the forward end of rollers for driving purpose. As shown in FIGURES 3 and 4, the roller shafts 12 are set at opposite angles to each other for placing the roller face centers approximately the same height also on center with the shoot 106 diameter center. This is the shoot 106 position as it is started downward into the soil. The rollers 27 have closed on the shoot and as the inner surface of both rollers is moving downward, the shoot is forced into the void in the soil prepared by the blade 13. Due to the different angles of the rollers 27 to that of plant 106, the left roller is crowding the shoot to the rear as the right roller is crowding forward, and this causes the shoot to twist or turn on its downward travel. This twisting action is for the purpose of depositing a small amount of soil above the small lower leaves and roots surrounding the butt of the shoot, which gives the shoot closer contact with the soil, and assists in more rapid plant growth.

The plant trough 40 shown in FIGURE 1 is bracketed and supported to the inside of subframe vertical members, and it consists of two members each with a cross-sectional 90 degree angle. One angle forms the side of the trough and the other the bottom. The bottom angles face each other and are spaced to allow blade bracket 13b to pass between, and also to form a bottom or stop for the shoots to rest upon on their travel rearward to receiving rollers 27. The space between side walls is such as to accommodate the larger size shoots, and also blade bracket 13g. It extends longitudinally from a point just to the rear of the sprocket 38 parallel to and on an even plane with chains 14 to a point just ahead of rollers 27. At a point beginning with sprockets 39, the trough is equipped on each side of inner walls with steel spring wire baffles B, attached at their forward end and at alternate spacing to the side walls, and extending downward and toward the center of the trough. Their purpose is to create a slight resistance on the shoots as they are being crowded through the trough to assist the shoot in maintaining an upright position.

In operation, the shoots are adapted to be taken manually by workmen from plant tray 4, and the shoots are placed butt end down into the trough 40, and between the blade assemblies 13. The shoots are crowded along in the trough and downward to nearly ground level in an upright position. As the blade 13 extends below the butt of the shoot and is traveling downward, it is forced through the paper and into the soil to full depth, where it reaches a point at vertical center of sprocket 21. At this point, the pivot point of blade spool 13a changes its course to an even plane to the ground surface, and the roller 17 continues on its downward path according to the angle preset of the adjustable guide 18. Due to the trailing action of roller 17 to the blade hinge point 13a, the blade 13 is caused to move toward the rear. It is to be remembered that the hinge point of the blade 13a remains neutral to the ground forward motion of the planter while traveling between sprockets 21 and 22 vertical centers. Furthermore, this operating description is based theoretically on the blade assemblies traveling toward the rear whereas actually they remain practically neutral to the forward travel of the machine and the blade operating mechanisms are traveling forward at tractor ground speed.

As the machine continues to move forward, the roller 17 moves out of the guide 18 and this releases the rearward pressure on the blade or paddle 13, and the blade assembly is caused to pivot on its axis so as to force the paddle 13 to move forward whereby a void is opened in the soil beneath the mulch paper and soil surface.

As the roller 16 comes in contact with the cam 15 and blade 13 is still in a rearward position, the blade plate 13g has positioned plant 106 between the face centers of rollers 27. Also, the timing is set on the revolving plates 25 to permit the rollers 24 to drop into notches 76. The tension on the springs 75 pull the arms 49 inward so as to permit the rollers 27 to close on the plant 106. The springs 75 maintain sufficient pressure on the rollers 27 to roll the shoot downward to its full depth in the soil during the forward movement of the blade 13. When this operation is completed, the rollers 24 will be out of engagement with the slots 76, and the rollers 27 are forced to open, so as to release the shoot. The rollers 27 are then held in an open position by rollers 24 and plate 25 to receive the next shoot.

The peripheral speed of the rollers 27 is such as to correspond with the length of the slots 76 to perform the foregoing action at exactly the time required for the forward movement of the blade 13. The mulch paper covering the void in the soil created by the blades forward movement is broken or pierced by the downward thrust of the plant and remains folded closely around the plant. As the blade spool 13a has now passed the vertical down center of sprocket 22, the blade 13 is being carried upward and to the rear of the machine drawing the blade from the soil. During this movement the roller 17 has entered the hinged double track 23, and as it passes cams 107, the roller is caused to move over first one cam and then under the other, while the blade is being withdrawn from the soil. This action sets up a vibrating effect on the blade 13 and this action has a three-fold purpose. First, it assists in settling the soil in and around the shoot. Secondly, it prevents lifting the shoot from the soil, and third it assists in shaking loose the soil from the paddle surface. From here the blade assembly is carried on and around the path of chains 14 and its action is repeated. Each and every blade assembly has the same action and is continuous. Since at the present time the common method of planting is two rows of plants per strip of mulch paper with alternate spacing of plants across the paper, the blade assemblies can be set accordingly.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out such principles, it being considered that the invention comprehends any minor changes in construction that may be permitted within the scope of the appended claims.

I claim:

1. A planter comprising a main frame, chains movably supported on said main frame, blade assemblies connected to said chains for digging openings in the ground, said planter further including a trough provided with a bottom portion acting as a plant stop gauge, means on the main frame for tilting said blade assemblies to form the openings in the ground, means including rollers mounted at the lower rear portion of the main frame for grasping the plant and twisting the plant as it is being injected into the opening in the ground dug by the blade assembly, cam means on the rear portion of the main frame for vibrating the blade assemblies as they are being drawn from the soil, and means on the main frame including a hinged roller guide for regulating the size of the openings dug in the ground by the blade assemblies whereby the depths of planting can be controlled.

2. A planter comprising a main frame, chains movably supported on said main frame, blade assemblies connected to said chains for digging openings in the ground, said planter further including a trough provided with a bottom portion acting as a plant stop gauge, means on the main frame for tilting said blade assemblies to form the openings in the ground, means including rollers mounted at the lower rear portion of the main frame for grasping the plant and twisting the plant as it is being injected into the opening in the ground dug by the blade assembly, cam means on the rear portion of the main frame for vibrating the blade assemblies as they are being drawn from the soil, and means on the main frame including a hinged roller guide for regulating the size of the openings dug in the ground by the blade assemblies whereby the depths of planting can be controlled, springs for applying tension to the blade assemblies, and means on the main frame for regulating the tension exerted by the springs on the blade assemblies.

References Cited in the file of this patent

UNITED STATES PATENTS

| | | |
|---|---|---|
| 1,495,550 | Cuddigan | May 27, 1924 |
| 2,609,115 | Oklejas | Sept. 2, 1952 |
| 2,626,578 | Morine | Jan. 27, 1953 |
| 2,637,287 | Strauss | May 5, 1953 |
| 2,749,855 | Guigas | June 12, 1956 |